United States Patent [19]

Brenzen

[11] 3,983,347
[45] Sept. 28, 1976

[54] AUTOMATIC KILL SWITCH ASSEMBLY
[76] Inventor: Timothy Brenzen, 206 - 641 Staffird St., Winnipeg, Manitoba, Canada
[22] Filed: Nov. 11, 1974
[21] Appl. No.: 522,461

[52] U.S. Cl. .............................. 200/157; 180/103 R; 200/61.85
[51] Int. Cl.² ......................................... H01H 9/06
[58] Field of Search ........................ 200/157, 61.85; 180/103 D, 103 R, 82 R, 5 R

[56] References Cited
UNITED STATES PATENTS
| | | | |
|---|---|---|---|
| 3,131,277 | 4/1964 | Brenzen | 200/157 |
| 3,141,944 | 7/1964 | De Voe | 200/157 |
| 3,694,596 | 9/1972 | Carlson | 200/157 |

Primary Examiner—Robert K. Schaefer
Assistant Examiner—M. Ginsburg
Attorney, Agent, or Firm—Stanley G. Ade

[57] ABSTRACT

On vehicles such as snowmobiles or other devices utilizing a internal combustion engine, it is usual to provide a throttle lever which is squeezed to open the throttle and released to close the throttle. Various forms of engine kill mechanisms are provided to stop the engine when the throttle pressure is released. These are usually provided with a mechanism for cutting out the kill switch for starting purposes and these are easily by-passed. The present device includes a relatively simple construction having a lever which can be positioned in many locations so that it is actuated by squeezing the throttle lever. An override is provided for starting purposes which is automatically released when the throttle is squeezed and cannot be by-passed.

6 Claims, 7 Drawing Figures

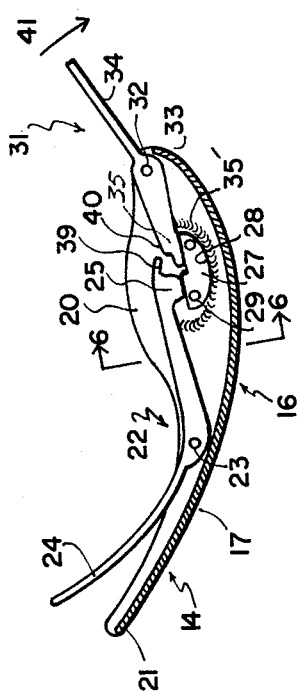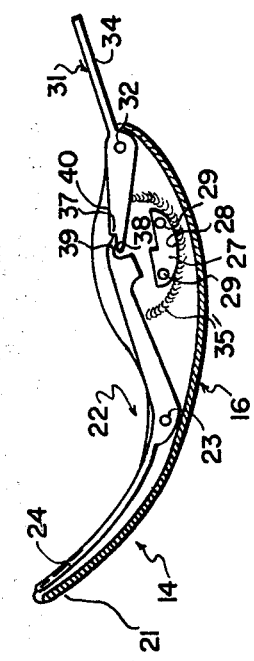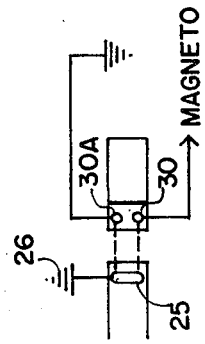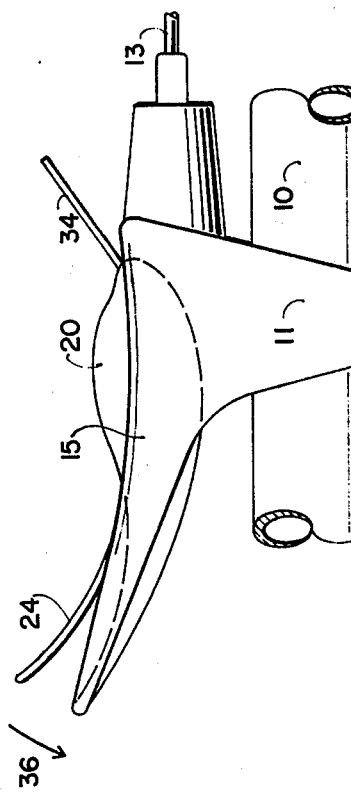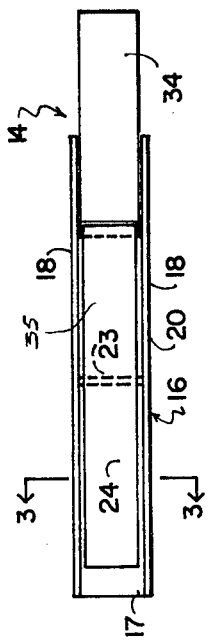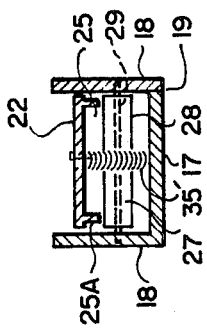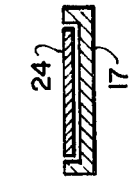

AUTOMATIC KILL SWITCH ASSEMBLY

BACKGROUND OF THE INVENTION

This invention relates to new and useful improvements in automatic kill swithces assemblies and although it is designed primarily for use with vehicles such as snowmobiles or all-terrain vehicles, nevertheless it can be incorporated with any gasoline engine which requires a throttle to be operated in order to open the throttle. For example, motorcycles, lawn mowers and the like could be fitted with such a device.

These devices are incorporated in snowmobiles and the like so that the engine is stopped as soon as the throttle is released. For example, it is of the utmost importance that a device such as a snowmobile, is de-activated when the throttle is released. If the rider falls of the machine, it is quite possible for the machine to continue if such a device is not fitted and this, of course, could be disastrous when used on trap lines or in other remote locations.

Conventional devices normally incorporate an over-ride system which cuts out the automatic kill switch assembly when the device is being started, and the majority of these are easily tampered with so that they can be de-activated and it is an object of the present invention to provide such a device which cannot be de-activated by the operator thus adding to the safety operation of such vehicles.

SUMMARY OF THE INVENTION

The principal object and essence of the invention is therefore to provide an automatic kill switch assembly which includes means to over-ride same for starting purposes, but which furthermore includes means to de-activate the over-ride portion as soon as the throttle is operated.

Another object of the invention is to provide a device of the character herewithin described which can be incorporated in the throttle assembly or can be supplied as a conversion kit and easily fitted to existing machines having a squeeze-type throttle.

Furthermore, the device can be utilized on either handle bar or either side of the vehicle depending upon the throttle location.

Another object of the invention is to provide a device of the character herewithin described which is very easily constructed from simple pressings and requires practically no machining thus reducing the production cost considerably and providing a device which is relatively trouble free.

Yet another object of the invention is to provide a device of the character herewithin described which is adaptable for use with such devices as snowmobiles, power saws, motorcycles, lawn mowers and the like so long as there is a handle bar device or the like to guide, steer or control same.

Yet another object of the invention is to provide a device of the character herewithin described which includes an "on" switch together with an automatic grounding device incorporated therein and which furthermore de-activates the "on" switch as soon as the throttle is actuated.

A still further object of the invention is to provide a device of the character herewithin described which includes a throttle kill switch assembly which automatically grounds the ignition system of the engine as soon as the throttle lever is released and whether or not the actual throttle control of the engine is closed. In other words, it operates by the hand control of the operator so that if the throttle jams or freezes, the device will still operate and kill the engine.

A still further object of the invention is to provide a device of the character herewithin described with is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

BRIEF DESCRIPTION OF THE DRAWINGS

FIG. 1 is a side elevation showing a conventional throttle lever with one embodiment of the present device incorporated therein.

FIG. 2 is a top plan view of the switch per se.

FIG. 3 is a section along the lines 3—3 of FIG. 2.

FIG. 4 is a side elevation of the switch per se with one side plate removed for clarity and showing the switch in the normal "ignition grounded" position.

FIG. 5 is a view similar to FIG. 4, but showing the device in the starting position.

FIG. 6 is a cross sectional view along the lines 6—6 of FIG. 4.

FIG. 7 is a schematic wiring diagram of one embodiment of the device.

In the drawings like characters of reference indicate corresponding parts in the different figures.

DETAILED DESCRIPTION

Proceeding therefore to describe the invention in detail, reference should first be made to FIG. 1 in which reference character 10 illustrates a handle bar or other steering or control means normally utilized.

Reference character 11 indicates a conventional throttle lever pivoted to the bar by means of pivot 12 and having a control cable assembly 13 extending therefrom to the conventional carburetor (not illustrated).

The switch mechanism is collectively designated 14 and may either be built integrally with the lever portion 15 of the throttle lever 11 or, alternatively, may be secured directly to bar 10 underneath the lever 15. Alternatively, it can be secured to one side of the lever portion 15.

Regardless of the location of the switch assembly 14, it is adapted to be actuated as soon as the throttle lever is squeezed against the handle bar portion 10 so that the throttle lever 11 cannot be actuated without actuating the switch assembly 14.

In the present embodiment, the switch assembly 14 includes a casing collectively designated 16. It includes an arcuately curved base portion 17 having a pair of spaced and parallel side plates 18 extending upwardly therefrom.

From a manufacturing standpoint, it may be desirable to form a base plate 17 integrally with one side plate 18 with the other side plate 18 being secured to the distal edge 19 of the base plate by means of the various pivots or rivets holding the assembly together as will hereinafter be described. Regardless of the form of construction, a substantially U-shaped channel casing is formed having a relatively deep side wall portion 20 and a relatively shallow side wall portion 21 extending therefrom.

A first lever collectively designated 22 is provided and is pivoted intermediate the ends thereof within the casing, by means of a pivot 23. An actuating portion or end 24 extends on one side of the pivot 23 and normally lies above the relatively shallow portion 21 of the casing as clearly shown in FIG. 4.

The inner end of lever 22 is situated upon the other side of the pivot 23 and includes a transverse contact portion 25 stamped downwardly from the material forming the lever 22. The contact 25 is connected to ground as indicated by reference character 26 in FIG. 7, due to the fact that the lever 22 is preferably made from a conducting material.

A contact assembly collectively designated 27 is secured within the portion 20 of the casing adjacent the base 17 thereof. This assembly is provided with an arcuately curved lower side 28 and is secured within the casing by means of rivets 29 or the like.

A pair of contacts 30 and 30A are provided within the assembly 27 and contact 30 is insulated from ground and is connected electrically to the magneto of the engine in such a way that when this contact 30 is grounded, the magneto is inoperative. This usually includes a connection to the primary circuit of the magneto, but as such grounding devices are well known, it was not believed necessary to describe same further.

The other contact 30A is connected to ground and ensures complete grounding of the ignition under normal conditions as will hereinafter be described.

A second lever is provided collectively designated 31 and this lever is also pivoted intermediate the ends, within the casing by means of the pivot 32 situated adjacent the end 33 of the casing.

A portion 34 extends on one side of the pivot, externally of the casing, and the other portion or inner end 35 extends inwardly in the casing on the other side of pivot 32.

A coil tension spring 35' is secured by one end thereof to adjacent the inner end of the first lever 22 and then extends around the arcuate surface 28 of the assembly 27 to be connected by the other end thereof to adjacent the inner end of the second lever 31 thus normally biassing or urging the inner ends of both levers downwardly into contact with the upper surface of the assembly 27 as clearly shown in FIG. 4.

Under these conditions, the ignition system of the engine is grounded due to the connection through contact 30 and 30A with contact 25.

When the throttle lever moved in the direction of arrow 36 (see FIG. 1) then the portion 24 of the first lever 22 is squeezed towards the casing portion 21 thus raising the contact 25 from contacts 30 and 30A and allowing the engine to start because the ignition is no longer grounded.

By the same token, as soon as the throttle lever 11 is released, then spring 35' will return the contact 25 into contact with contact 30 and 30A thus grounding the ignition and killing the engine.

It is of course desirable that means be provided to enable the engine to be started without grasping the lever 11 and to allow the engine to idle under these conditions and in this connection, lever 31 is utilized.

A trigger portion is provided on the inner end of the second lever 31 and this trigger portion includes a vertical wall portion 37 and a substantially horizontal ledge 38 extending therefrom. Normally, the inner end 39 of the first lever, rests upon the upper surface of the assembly 27 and is not affected by the trigger portion, but as soon as the portion 34 of the second lever 31 is moved in the direction of arrow 41 (see FIG. 4) then the end 39 of the first lever 22 is raised clear of the assembly 27 so that the end 39 now rests upon the ledge 38 and snubs against the vertical wall 37 being in compressive relationship with this wall due to the extension of the spring 35' as clearly shown in FIG. 5.

This holds the contact points 25 clear of contact points 30 and 30A and allows the engine to be started.

However as soon as the throttle lever 11 is squeezed in the direction of arrow 36, the portion 24 of the first lever is moved towards the portion 21 of the casing and this raises the inner end 39 of the first lever 22 clear of the vertical wall 37 so that spring 35' immediately snaps the second lever 31 back to the position shown in FIG. 4 thus disengaging the first lever from the second lever so that it is now only controlled by the sequeezing pressure of the throttle lever 11. As soon as this throttle lever is released, then the first lever returns to the grounding position shown in FIG. 4 and the engine is killed.

The mechanism is simple in construction, and is impossible to over-ride without dismantling the switch assembly. Furthermore, it can be fitted in many locations and on either side of the handle bar or control system of the vehicle of appliance.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A kill switch assembly operatively connectable to the ignition system of an engine; comprising in combination a casing, a first lever pivoted within said casing, insulated contact assembly in said casing operatively connected to the associated ignition system of said engine, means to ground said first lever, spring means operatively connected between said casing and said first lever normally urging said first lever into contact with said contact assembly whereby said ignition system is grounded and inoperative, a second lever mounted in said casing for detachably holding said first lever clear of said insulated contact assembly against the pressure of said spring means, and means to disconnect said second lever from said first lever when said first lever is actuated whereby actuation of said first lever disconnects said first lever from said contact assembly against pressure of said spring means.

2. The device according to claim 1 in which said first lever includes at least one grounded contact, said contact assembly includes at least one contact thereon insulated from ground operatively connected to said ignition system, said grounded contact being normally engaged with said contact insulated from ground by the pressure of said spring means.

3. The device according to claim 1 in which said first lever is pivoted intermediate the ends thereof within said casing, a second lever engaging portion formed on the inner end of said first lever, said second lever also being pivoted within said casing intermediate the ends thereof, a trigger portion formed on the inner end of said second lever engageable with said second lever engaging portion on the inner end of said first lever, said spring means including a tension coil spring secured by one end thereof to said first lever adjacent said inner end, extending around said insulated contact assembly, and being secured by the other end thereof adjacent the inner end of said second lever, said spring means placing said inner ends in compressive relationship when said trigger portion is engaged with said first lever, to hold said first lever clear of said contact assembly.

4. The device according to claim 2 in which said first lever is pivoted intermediate the ends thereof within said casing, a second lever engaging portion formed on the inner end of said first lever, said second lever also being pivoted within said casing intermediate the ends thereof, a trigger portion formed on the inner end of said second lever engageable with said second lever engaging portion on the inner end of said first lever, said spring means including a tension coil spring secured by one end thereof to said first lever adjacent said inner end, extending around said insulated contact assembly, and being secured by the other end thereof adjacent the inner end of said second lever, said spring placing said inner ends in compressive relationship when said trigger portion is engaged with said first lever, to hold said first lever clear of said contact assembly.

5. The device according to claim 3 in which said trigger portion includes a stepped portion of said inner end of said second lever including a substantially vertical wall and a substantially horizontal ledge extending from said wall, the inner end of said first lever engaging upon the upper side of said contact assembly when said second lever is in the inoperative position, and engaging upon said ledge and snubbing against said vertical wall when said second lever is in the operative position, to hold said first lever clear of said contact assembly, actuation of said first lever disengaging said inner end thereof from said vertical wall whereby said spring means returns said second lever to the inoperative position.

6. The device according to claim 4 in which said trigger portion includes a stepped portion on said inner end of said second lever including a substantially vertical wall and a substantially horizontal ledge extending from said wall, the inner end of said first lever engaging upon the upper side of said contact assembly when said second lever is in the inoperative position, and engaging upon said ledge and snubbing against said vertical wall when said second lever is in the operative position, to hold said first lever clear of said contact assembly, actuation of said first lever disengaging said inner end thereof from said vertical wall whereby said spring means returns said second lever to the inoperative position.

* * * * *